United States Patent [19]
Lautenschläger et al.

[11] Patent Number: 5,577,297
[45] Date of Patent: Nov. 26, 1996

[54] DOOR FASTENING MEMBER CONSTRUCTED AS A HINGE CUP FOR FURNITURE HINGES

[75] Inventors: Horst Lautenschläger, Reinheim; Gerhard Lautenschläger, Brensbach-Wersau, both of Germany

[73] Assignee: MEPLA-Werke Lautenschläger GmbH & Co. KG, Germany

[21] Appl. No.: 311,542

[22] Filed: Sep. 23, 1994

[30] Foreign Application Priority Data

Oct. 25, 1993 [DE] Germany .............. 43 36 326.1
Apr. 26, 1994 [DE] Germany .............. 44 14 460.1

[51] Int. Cl.⁶ .................... E05D 5/00; E05D 7/10
[52] U.S. Cl. .................... 16/332; 16/383; 16/388; 16/254; 16/272; 16/384
[58] Field of Search ............. 16/382, 383, 384, 16/387, 388, 254, 272

[56] References Cited

U.S. PATENT DOCUMENTS

| | | |
|---|---|---|
| 4,622,716 | 11/1986 | Lautenschlager ............ 16/382 |
| 4,642,846 | 2/1987 | Lautenschlager ............ 16/382 |
| 5,195,214 | 3/1993 | Lautenschlager ............ 16/382 |
| 5,345,654 | 9/1994 | Ferrari et al. ............ 16/382 |

FOREIGN PATENT DOCUMENTS

| | | | |
|---|---|---|---|
| 2524503 | 12/1976 | Germany ............ 16/383 |
| 3431999. | 11/1989 | Germany . |

Primary Examiner—M. Rachuba
Assistant Examiner—Adesm Bhargava
Attorney, Agent, or Firm—Dvorak and Traub

[57] ABSTRACT

A door fastening member of a furniture hinge having a hinge cup for installation sunk in a recess in the rear surface of a door leaf. The hinge cup has a fastening flange engaging the inner surface of the door leaf. Projecting from the underside of the fastening flange, spaced from the hinge cup, are offset fastening pegs which engage in associated bores in the door leaf and which may each be fixed in the associated bore by means of a fastening element which is rotatable relative to the fastening flange.

Due to eccentric mounting of the rotatable fastening element, knife-like anchoring ribs provided on the fastening element of the fastening peg are movable out of a position of the bores.

42 Claims, 8 Drawing Sheets

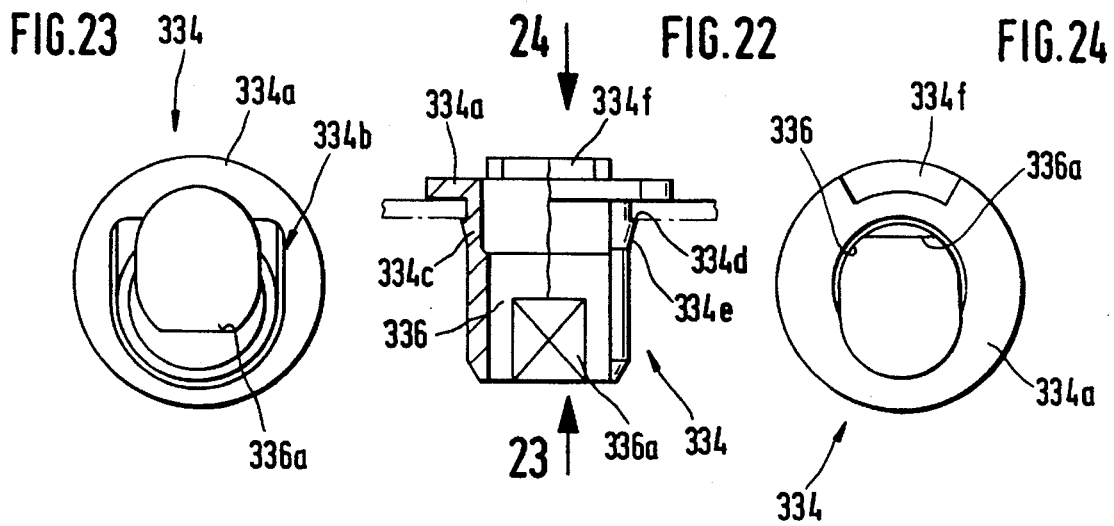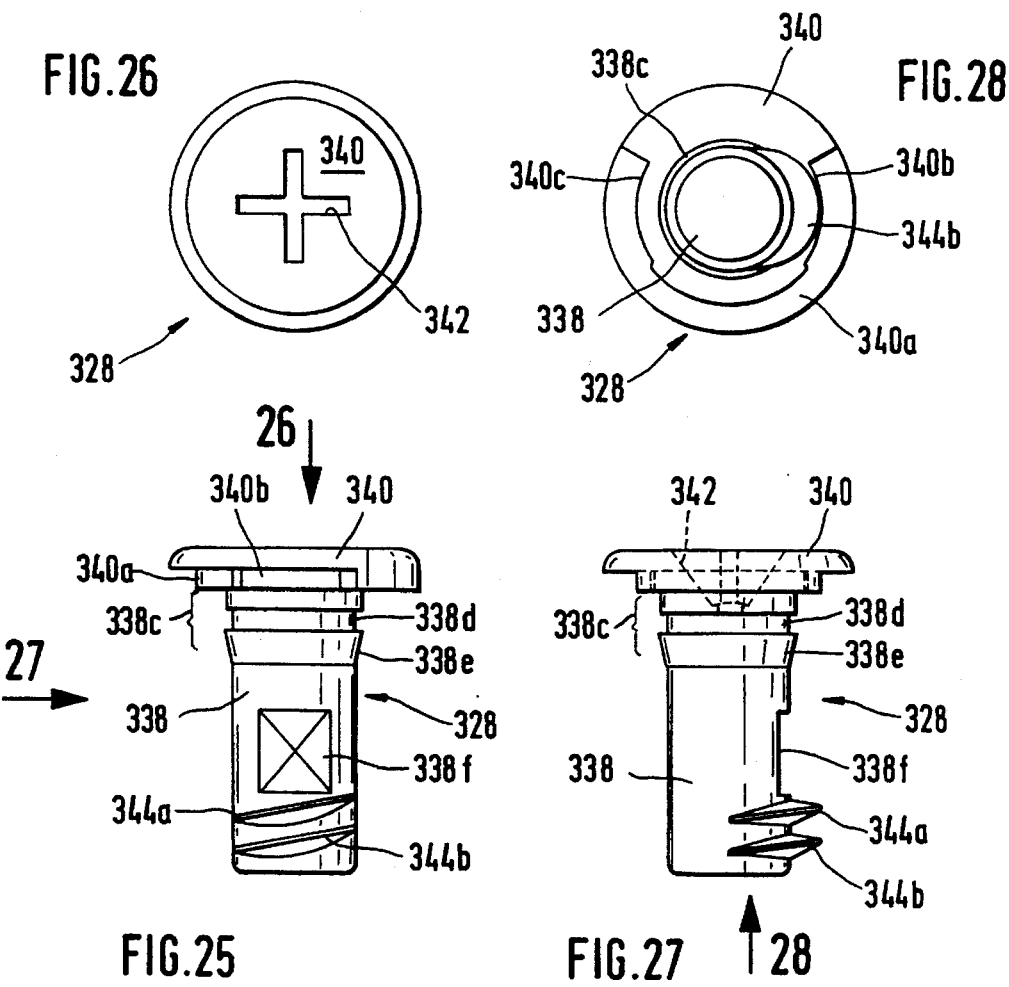

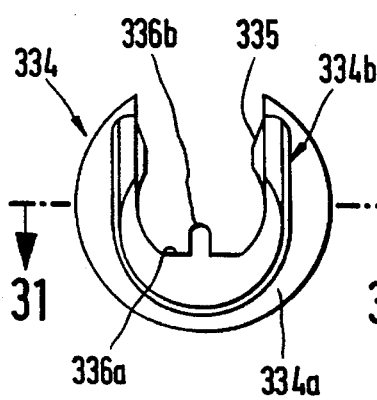
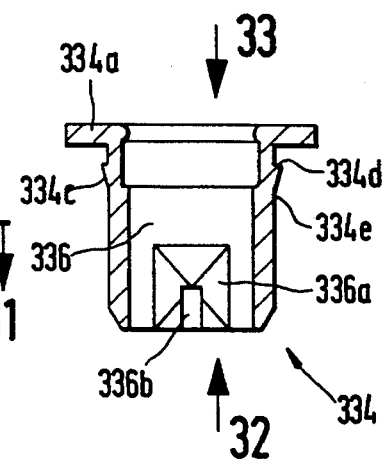
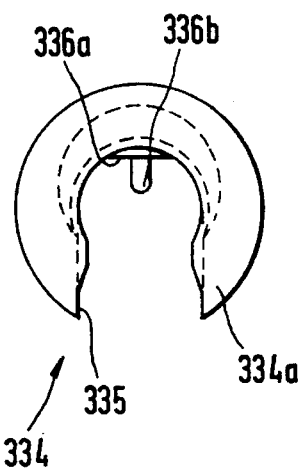
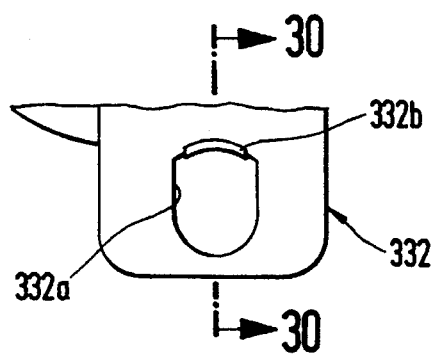
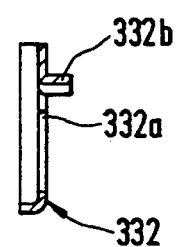
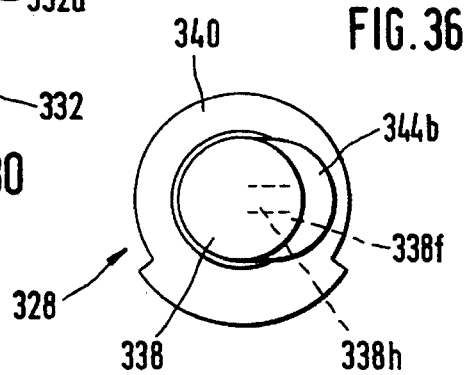
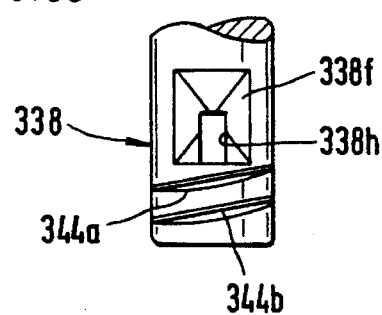
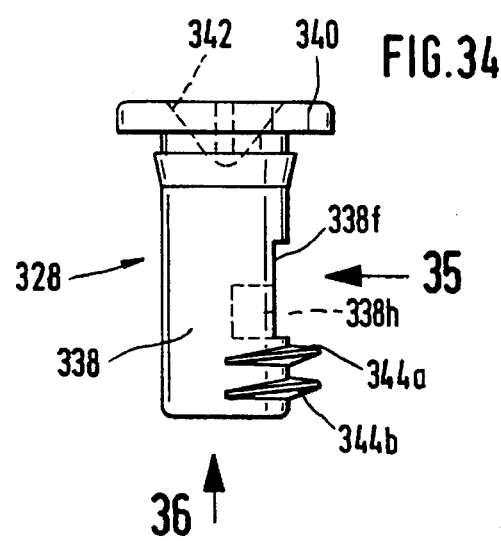

DOOR FASTENING MEMBER CONSTRUCTED AS A HINGE CUP FOR FURNITURE HINGES

BACKGROUND OF THE INVENTION

The invention relates to a door fastening member of a furniture hinge constructed as a hinge cup which may be installed sunk in a recess in the rear surface of a door leaf, which member has at its upper edge a fastening flange which engages the inner surface of the door leaf and projecting from whose underside at a lateral spacing from the actual cup member are offset fastening pegs which engage in associated bores in the door leaf and which may each be fixed in the associated bore by means of a fastening element which is rotatable relative to the fastening flange.

Whilst the door fastening members, constructed as hinge cups, of hinges were originally manufactured almost exclusively of plastics material in an injection moulding process, whereby they were constructed predominantly as impact installable cups pressed in a force-locking manner into the associated recess in the rear surface of the door leaf due to the inherent elasticity of the plastics materials used, which impact cups were in part additionally also secured in a form-locking manner by screws, they have been manufactured in more recent times increasingly either of metal in an injection die casting process or of metal plate in a stamping-pressing process. The fastening of such metallic hinge cups by pressing or hammering in requires additional measures, for instance the arrangement of fastening pegs of elastic plastics material which engage in separate fastening bores and which are separately manufactured and are arranged on a fastening flange projecting from the actual cup member of the hinge cup. These fastening pegs are either constructed as oversized fastening pegs which may be driven or pressed into the fastening bores, that is to say may be fixed in position in a force-locking manner, or they can be of expanding dowel-like construction by virtue of longitudinal slitting, whereby the expansion then occurs after the pre-mounting of the hinge cup on the door leaf by screwing the shaft of fastening elements constructed as set screws into a through bore in the fastening flange and the fastening pegs. The disadvantage of hinges of this construction is that the fastening of the pre-mounted hinge cup can only be effected by means of a screwdriver and the retaining force which may be achieved depends also on the precise dimensional matching of the external diameter of the fastening peg to the diameter of the fastening bore whilst taking account of the expansion which may be achieved by screwing in the shaft of the fastening screw and also on the characteristics of the material of the door leaf. As a result of peripheral, sharpened ribs on the external surface of the fastening pegs, which penetrate somewhat into the wall of the fastening bore during the expansion process, a certain form lock of the fastening pegs in the fastening bore is produced over and above a pure force lock. During disassembly the resiliently expanded fastening peg portions must, however, then relax back so far that the sharpened ribs come completely free from the recess formed by them in the wall of the fastening bore, which is not always guaranteed. The demounting of the known hinges thus cause problems from time to time.

With this background, it is the object of the invention to provide a metallic hinge cup which may be fastened in recesses and fastening bores in the rear surface of door leaves and which makes an absolutely reliable mounting and demounting of the hinge cup possible without a special tool being necessary for this purpose.

SUMMARY OF THE INVENTION

Starting from a hinge cup of the type referred to above, this object is solved in accordance with the invention if the fastening pegs are provided with a through opening which opens out in the upper surface of the fastening flange and in which a respective shaft of the fastening element is rotatably mounted, that the through openings in the fastening pegs are eccentrically arranged so that the fastening pegs have a greater wall thickness over a region in the peripheral direction than in the diametrically opposed region, that the shafts of the fastening elements project out of the open undersides remote from the fastening flange of the through openings and in the projecting region each have at least one anchoring rib which is sharpened in the manner of a knife edge and extends substantially in the peripheral direction and which, in the rotary position of the fastening element aligned with the region of greatest wall thickness, does not project radially beyond the projection of the respective fastening peg but in a position rotated to this wall region projects radially beyond the fastening peg projection, and that attached to the upper end on the fastening flange side of the shaft of the fastening element there are application means which render rotation of the fastening element possible. The anchoring of the fastening pegs in the associated fastening bores in the door leaf is thus no longer effected in a force-locking manner but by form-locking penetration of the anchoring ribs in the wall of the respective fastening bore, whereby the application means provided on the fastening element make possible the rotation of the fastening element out of the mounting and demounting position, in which the anchoring ribs are directed towards the region of greatest wall thickness of the fastening peg, into the locked position projecting beyond the projection of the fastening peg.

This rotation is possible without special tools, such as screwdrivers or the like, if the application means are constructed as a handle affording a lever arm with respect to the rotary axis of the fastening element.

In an advantageous embodiment of the invention the eccentricity of the through opening in the fastening peg is so selected that it opens into the surroundings in the shape of a slit in the region of the fastening peg opposite to the region of greatest wall thickness and that the shaft of the fastening element completes the fastening peg in the slit-like cut away region to form a fastening peg with a closed peripheral wall. The fastening peg is thus centred with the inserted fastening element is thus so to speak centred in the installed state on all sides in the associated fastening bore and retained in a form-locking manner by the anchoring rib(s) which projects with respect thereto and cut(s) into the wall of the fastening bore.

The breadth of the slit-like cut away region can be exactly equal to the diameter of the shaft of the fastening element.

The handle provided at the upper end on the fastening flange side of the shaft of the fastening element can have the form of a flat handle fittingly covering a portion of the fastening flange at the upper surface, formed integrally on which handle is the lever arm which enables the rotary actuation. The position of the lever arm then indicates whether the respective fastening element is rotated into the fastened position in which the insertion cup is fixed to the door leaf or into a released position.

In order to make the assembly of the fastening element in the insertion cup possible, the construction is preferably such that the through opening in the fastening flange is so enlarged in the region diametrically opposite to the wall region of greatest wall thickness that the shaft of the fastening element may be passed through the through opening in the fastening flange when the shaft of the fastening element is rotated into a position in which the anchoring rib(s) is or are aligned with this enlarged region.

Conveniently provided on the fastening flange and the handles of the fastening elements are cooperating abutments which limit the rotation of the fastening element in the fastening peg between the introduction position, in which the anchoring rib(s) does or do not project radially beyond the projection of the fastening peg and the locked position which projects the maximum amount by comparison to a rotational angle of about 180°.

If the insertion cup is manufactured in a manner known per se of metal in an injection die casting process, preferably zinc die casting process, the fastening pegs are then preferably integrally moulded on the underside of the fastening flange, although in principle separate manufacture and subsequent mounting on the fastening flange is also conceiveable.

If, alternatively, the insertion cup is manufactured of metal plate in a stamping-pressing process, the construction is preferably such that the fastening pegs are constituted by tongues which are stamped out of the material of the fastening flange and bent over through 90° in the direction of the underside directed towards the door leaf of the fastening flange.

In order that, despite the manufacture of the fastening pegs of thin walled sheet material, a construction is possible such that the anchoring rib(s) can be rotated into a position in which it or they does not or do not project beyond the projection of the fastening peg, at least one groove-like profiling is impressed in a further embodiment of the invention into the bent over tongues, the depth of which is such that the anchoring rib(s), rotated in alignment with the profiling, of the fastening element supported with its shaft engaging the tongue does or do not project radially beyond the profiling.

A groove can then conveniently be cut in the upper end of the shaft of the fastening element below the handle in which projections, which project from the edges of the stamping for the tongue constituting the fastening peg, engage and thus fix the fastening element in the predetermined mounted position.

This can so occur that slits are stamped in the fastening flange at a small spacing from the longitudinal edges, which limit the stamping, extending parallel to them, whereby then the projections engaging in the groove in the shaft of the fastening element are constituted by deformed regions of the narrow webs defined between the edges of the stamping and the slits.

The fastening elements for their part are preferably constructed as integral metallic injection die cast components.

If the insertion cup is formed as an integral metallic injection die cast component, the fixing of the fastening element in respective associated fastening pegs can occur due to the fact that projecting from the wall, which rotatably supports the shaft of the fastening element, of the through opening in the fastening peg there is at least one low projection which engages in an associated recess, which extends in the peripheral direction, in the shaft of the fastening element and secures it against being withdrawn from the through opening.

The projection(s) can have a triangular cross-section whose front triangular side in the direction of insertion of the shaft of the fastening element into the through opening has a flat, inclined, ramp-like shape with respect to the inner wall of the through opening whilst the rear triangle side in the direction of insertion extends substantially at right-angles to the wall of the through opening, thereby the recess in the shaft of the fastening element has, on its side directed away from the handle a boundary wall extending in the peripheral direction substantially at right-angles to the peripheral surface of the shaft. The introduction of the shaft of the fastening element into the through opening in the fastening peg is then facilitated by the ramp-like construction of the projection whilst an undesired withdrawal is reliably prevented.

In a further modified exemplary embodiment of the hinge cup in accordance with the invention the function of the fastening peg and of the shaft of the fastening element are combined, whereby the construction is such that a fastening pegs are each constituted by an elongate shaft which is rotatably mounted in a through opening in the fastening flange, forms part of the fastening element and whose diameter is smaller than the diameter of the associated bore in the door leaf, that projecting on one side in the end region at the interior of the bore of the elongate shaft there is at least one respective anchoring rib, which extends substantially in the peripheral direction and is sharpened in the manner of a knife blade, whereby the diameter of the fastening pegs in the end region at the interior of the bore measured over the anchoring ribs is approximately equal to the diameter of the associated bore in the door leaf, that the distance of the rotary axis of the shafts from the central longitudinal plane of the hinge cup differs in each case from the distance of the central line of the associated bore in the door leaf from the longitudinal central plane of the hinge cup installed with its cup portion in the associated recess in the door leaf by the distance of the projection of the anchoring rib(s) beyond the actual shaft, and that provided at the upper end on the fastening flange side of the shaft there is a respective handle which constitutes a lever arm with respect to the rotary axis of the shaft and is arranged on the upper surface of the fastening flange.

The shaft of the fastening element is thus mounted eccentrically in the fastening flange with respect to the associated bore in the door leaf so that the anchoring ribs are situated in the bore in the door wing independently of the position of the handle or cut into its wall and lock the shaft and thus also the hinge cup in the bore in a form-locking manner.

In order to be able to mount the fastening element constructed in this manner rotatably in the through opening in the fastening flange in the necessary manner, the shaft and the handle of the fastening element are separately manufactured components in a further embodiment of the invention, whereby the handle is rotationally fixedly secured to the upper end of the shaft, after mounting the fastening element in the through opening in the fastening flange.

In order to secure the shaft projecting from the underside of the fastening flange against tilting during the locking process as a result of the forces then acting in the region of the anchoring rib at right-angles to its axis of rotation, it is advisable to support the shaft with a disc-shaped annular flange of enlarged diameter on the underside of the fastening flange of the hinge cup.

This annular flange can either be integrally formed on the shaft or—preferably—be constituted by a separately manufactured disc arranged in the region of the upper end of the shaft on a collar on the same.

The respective anchoring rib(s) provided on the shaft of the fastening elements are conveniently arranged to extend gently obliquely inclined in the peripheral direction with respect to a plane extending at right-angles to the central longitudinal plane of the shaft, whereby the direction of the inclination is so selected that the shaft of the respective fastening element experiences a tightening into the bore in the door leaf on rotation out of the position of the anchoring rib(s) situated within the bore in the door leaf into the position cutting radially into the bore wall. The insertion cup is thus drawn during the mounting process into firm engagement of its fastening flange against the inner surface of the door leaf.

If the handle is arranged on the fastening element, the mounting and demounting of the insertion cup on the door leaf is possible without a special tool. Nevertheless, it can be advantageous in special cases if additionally or alternatively a tool application recess in the form of a screwdriver slot, a cross slot or a recess of hexagonal plan shape suitable for introduction of a chuck is provided in the end region of the fastening element, which is provided with the handle and is situated above the fastening flange of the insertion cup, whereby the tool application recess is then conveniently aligned with the central longitudinal axis of the shaft of the fastening element.

It has been found in use of the described hinge cups that particularly hinge cups manufactured from sheet metal require for their manufacture a plurality of constructionally complex stamping-pressing tools, which have successive stations and which can only be amortised with production hinges manufactured in large numbers. Furthermore, the simple mounting and demounting of the hinge cups, which is inherently desired, on or in door leaves without a tool leads to the danger that the hinges can be loosened when not desired, e.g. due to children playing, which—in the most unfavourable case—can result in a door leaf connected to a cupboard carcass with a hinge including such a hinge cup falling off. In order that the hinge cups may be manufactured more simply and economically even in small numbers yet have the advantageous retaining function resulting from rotatable fastening elements disposed in the hollow fastening pegs, it can be convenient in an advantageous embodiment of the invention to manufacture the fastening pegs separately and to fasten them in a respective associated stamped out region in the fastening flange. As a result, the constructional and manufacturing difficulties necessarily occurring in the one-piece manufacture of the fastening pegs with the hinge cup are avoided.

The eccentricity of the through opening in the fastening peg is again conveniently so selected in the present case also that it opens out into the exterior with a slit-shape in the region of the fastening peg opposite to the region of greatest wall thickness and that the shaft of the fastening element completes the fastening peg in the slit-like cut-away region into the fastening peg with a closed peripheral wall. In this case also the fastening peg with the inserted fastening element is again centered on all sides in the associated fastening bore in the installed state and is held in a form-locking manner by the anchoring rib(s) which project with respect to it and cut into the wall of the fastening bore.

The fastening pegs are preferably provided at their upper end on the fastening flange side with an engagement flange, which projects beyond the boundary of the respective associated stamped out portion and which thus limits the insertion depth—during installation by introducing the fastening flange into the stamped out portion from the upper surface of the fastening flange.

The stamped out portion in the fastening flange then conveniently has a shape differing from the fully circular and the fastening pegs have a shape which complementarily corresponds to the shape of the stamped out portion in the region immediately adjacent to the underside of the engagement flange. Rotation of the fastening pegs in the stamped out portion is thus prevented.

The rotational security can be further improved if provided in the engagement flange of the fastening peg in alignment with the region, which opens out into the exterior in the manner of a slit, of the through opening in the fastening peg there is a continuous interruption, into which a tongue, which is bent upwardly and is cut into the edge of the stamped out portion in the fastening flange, fittingly engages.

It is then particularly advantageous if the shape of the stamped out portion and of the region of the fastening peg provided beneath the fastening flange are so constructed that installation of the fastening peg into the stamped out portion is only possible in a position in which the region of greatest wall thickness of the fastening peg has a predetermined alignment with respect to the actual cup member of the hinge cup. An inadvertently incorrect installation of the fastening peg is then not possible.

The alignment of the stamped out portion in the fastening flange can be such that the region of greatest wall thickness in the fastening peg lies either on the side directed away from the cup member or on the side directed towards the cup member.

If the fastening flange has a flat recess on its underside directed towards the inner surface of an associated door leaf, at least in the region of the fastening pegs, which is in any event the case with hinge cups of metal sheet, since the fastening flanges of these are provided with corresponding edges which are bent over in the direction towards the door leaf and stiffen the fastening flanges, it is possible to provide on the fastening peg at least one formation forming a radially projecting locking surface on its side directed towards the engagement flange, whereby the spacing between the locking surface and the underside directed towards it of the engagement flange is approximately equal to the thickness of the material of the fastening flange in the region of the stamped out portion. The formation provided with the locking surface thus engages in the predetermined installed position of the associated fastening peg over the underside of the fastening flange and secures it against withdrawal out of the stamped out portion.

The formation should extend over at least a portion of the periphery of the fastening peg in order to ensure that the preinstalled fastening peg cannot inadvertently be pushed out of the stamped out portion, even when the (not yet mounted) hinge is handled carelessly.

In order to facilitate the installation of the fastening pegs in the respective associated stamped out portions in the fastening flange, it is recommended that the formation be so constructed that it has a limiting edge tapering conically in the direction towards the free end of the fastening peg in a sectional plane extending through the central longitudinal axis of the fastening peg.

The fastening element rotatably arranged in the fastening peg can be secured in the installed position against undesired disassembly if a peripheral groove extending over at least a portion of the periphery of the shaft is provided in the region of the shaft of the respective fastening element which is opposite to the edges of the stamped out portion in the predetermined installed position of the fastening peg in the stamped out portion in the fastening flange, the breadth of which groove is equal to the thickness of the material of the fastening flange in the region adjacent to the stamped out portion, whereby the edge defining the stamped out portion engages in the peripheral groove in the region opposite to the region of greatest wall thickness of the fastening peg. The groove is conveniently provided in an upper shaft portion whose diameter is somewhat enlarged with respect to the diameter of the shaft of the fastening element, whereby the transition region between the regions of different diameter of the shaft of the fastening elements is constructed as an oblique conical surface extending in the peripheral direction.

The engagement flange of the fastening peg is of circular shape in plan in a preferred embodiment of the invention and attached to the upper end of the shaft of the rotatable fastening element is a circular shaped end plate covering the engagement flange, whereby provided in the surfaces directed towards one another of the engagement flange or of the end plate there is a projection which engages in an associated arcuate opening in the end plate or in the engagement flange. The projection and the opening are preferably so arranged and dimensioned that the rotation of the actuating element is limited to a rotational angle of 180°.

The application means which enable rotation of the shaft of the fastening element are conveniently constituted by a recess worked into the side of the end plate directed away from the shaft or a projection projecting from this side for introducing or applying a rotary tool. Possible recesses are conventional screwdriver slots, cross slots or recesses of hexagonal shape in plan view for the application of corresponding screwdrivers or hollow screw keys, whilst projections can have a polygonal cross-section to which corresponding keys can be applied.

An embodiment is advantageous in which, provided in the region of greatest wall thickness of the fastening peg in the end region directed away from the fastening flange of the through opening, there is a wall region, which projects with respect to the wall which is otherwise of circular arcuate cross-section, and provided in the region, which is opposite to the projecting wall region, of the shaft of the fastening element rotated into the introduction position of the fastening peg into the associated bores in the rear surface of a door leaf, there is a corresponding recess, both of which can have a flat surfaced base region. The fastening element is thus on the one hand held secure against rotation in the installation position necessary for installation and on the other hand an expansion of the fastening peg is effected on rotation of the fastening element in addition to the form-locking fastening of the anchoring ribs, which expansion additionally clamps the fastening peg in the fastening bore in the door leaf.

The rotational securement mentioned above can be further improved if projecting from the projecting wall region of the through opening in the fastening peg there is additionally a formation which engages in the recess which is provided in the base region of the recess in the shaft of the fastening element and fittingly complementarily receives the formation. This formation is sheared off on rotation of the fastening element for the purpose of anchoring the fastening pegs in the associated bores and then remains in the recess receiving it.

The fastening peg is preferably an injection moulded component of plastics material, though in other cases manufacture as an injection die cast component of metal, for instance a zinc die cast component, is also possible.

The rotatable fastening element itself is conveniently a die cast metallic component.

BRIEF DESCRIPTION OF THE DRAWINGS

The invention will be explained below in more detail in conjunction with the drawings of a number of exemplary embodiments, in which:

FIG. 22 is a sectional view corresponding to the section of FIG. 21 through the fastening peg alone;

FIG. 23 is an underneath view of the fastening peg, seen in the direction of the arrow 23 in the FIG. 22;

FIG. 24 is a plan view of the fastening peg, seen in the direction of the arrow 24 in FIG. 22;

FIG. 25 is a side view of the fastening element rotatably mounted in the fastening peg illustrated in FIGS. 22 to 24;

FIG. 26 is a plan view of the fastening element, seen in the direction of the arrow 26 in FIG. 25;

FIG. 27 is a view of the fastening element, seen in the direction of the arrow 27 in FIG. 25;

FIG. 28 is an underneath view of the fastening element, seen in the direction of the arrow 28 in FIG. 27;

FIG. 29 is a plan view, corresponding to FIG. 20 as regards the direction of the view, of the lower portion of the fastening flange of a further exemplary embodiment of a hinge cup in accordance with the invention;

FIG. 30 is a sectional view seen in the direction of the arrows 30—30 in FIG. 29;

FIG. 31 is a sectional view of one of the two fastening pegs provided in the exemplary embodiment of FIGS. 29 and 30, seen in the direction of the arrows 31—31 in FIG. 32;

FIG. 32 is an underneath view of the fastening peg, seen in the direction of the arrow 32 in FIG. 31;

FIG. 33 is a plan view of the fastening peg, seen in the direction of the arrow 33 in FIG. 31;

FIG. 34 is a side view of the fastening element rotatably mounted in the fastening peg illustrated in FIGS. 31 to 33;

FIG. 35 is a view of the lower portion of the shaft of the fastening element, seen in the direction of the arrow 35 in FIG. 34; and FIG. 36 is an underneath view of the fastening element, seen in the direction of the arrow 36 in FIG. 34.

DETAILED DESCRIPTION OF THE INVENTION

Figure 1:
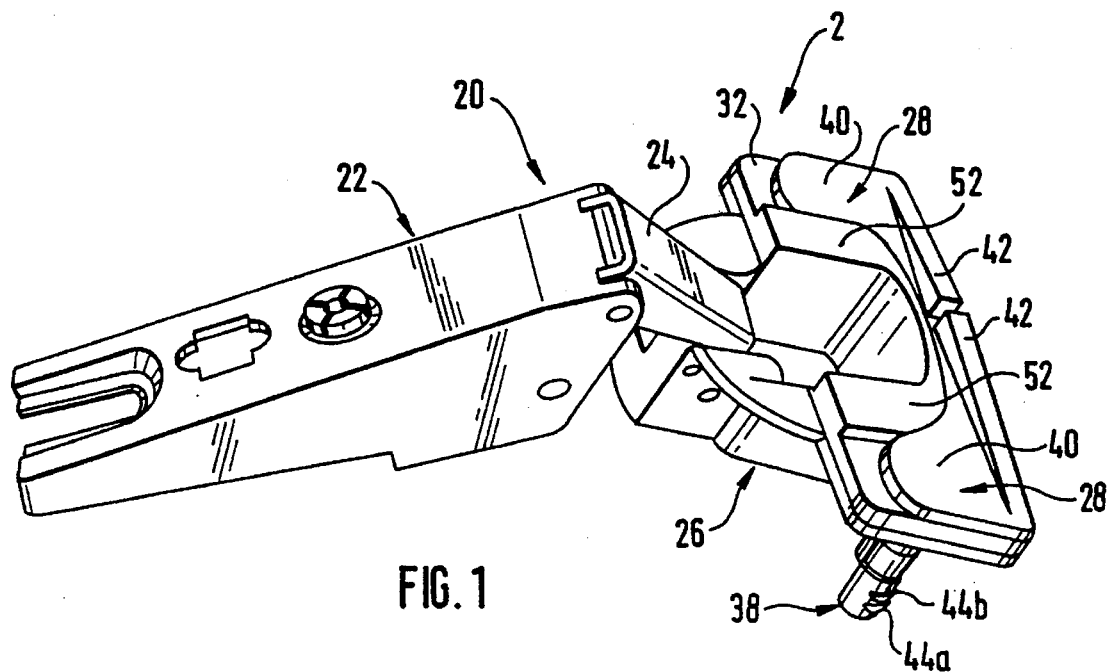
FIG. 1 is a perspective view of a furniture hinge whose door fastening member is constructed as a hinge cup which is constructed in accordance with the invention and may be mounted sunk in a recess in the rear surface of a door leaf.
Figure 2:
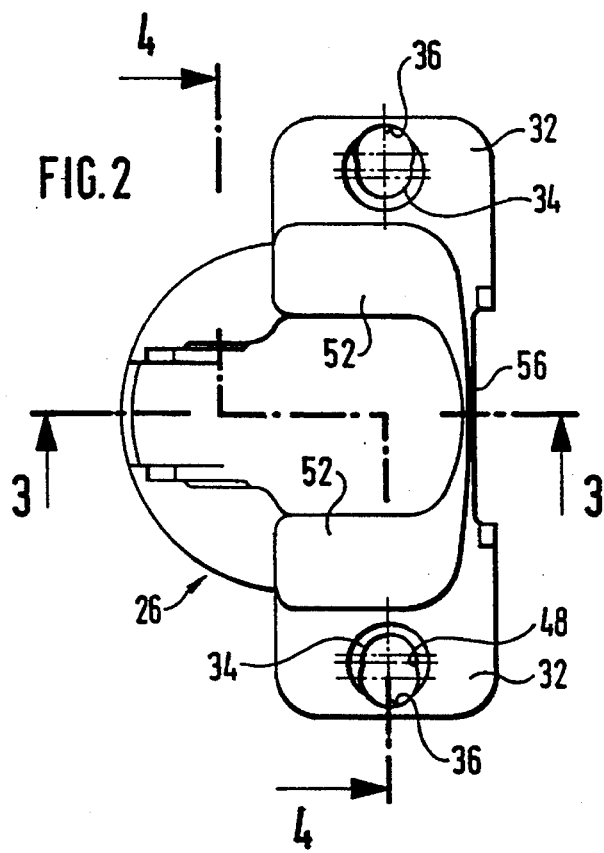
FIG. 2 is a plan view of an exemplary embodiment of a hinge cup in accordance with the invention without the fastening elements fastening it to the door leaf, seen in the direction of the arrow 2 in FIG. 1.
Figure 3:
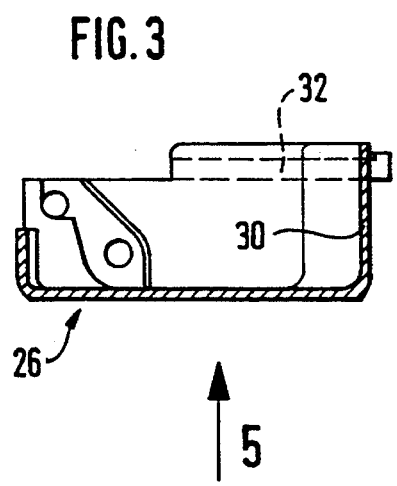
FIG. 3 is a sectional view seen in the direction of the arrows 3—3 in FIG. 2.
Figure 4:
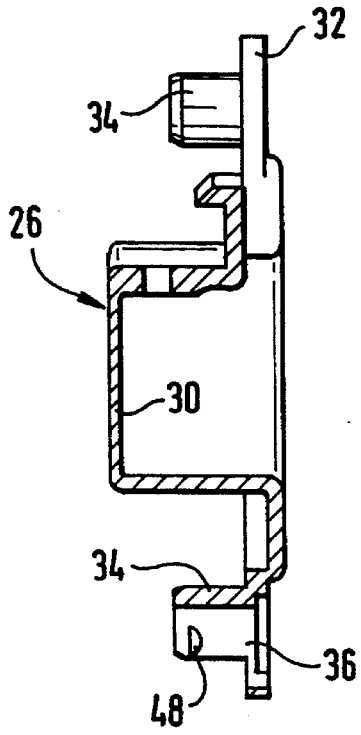
FIG. 4 is a sectional view in the sectional plane defined by the arrows 4—4 in FIG. 2.
Figure 5:
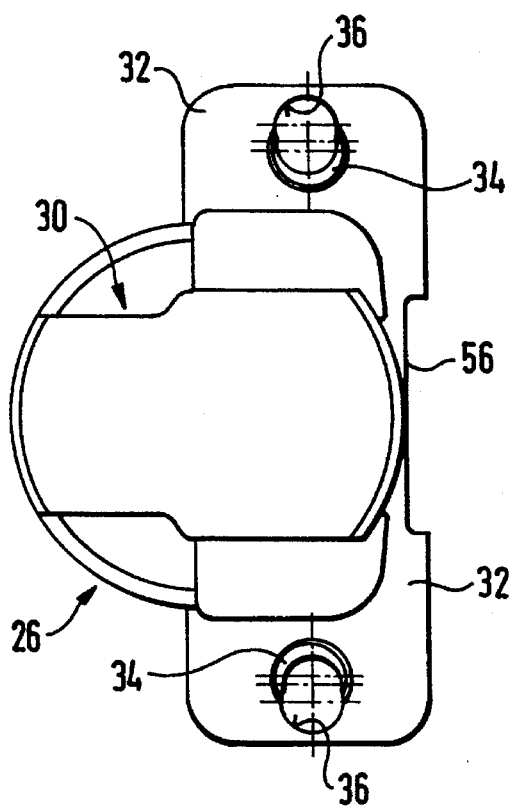
FIG. 5 is an underneath view, seen in the direction of the arrow 5 in FIG. 3.
Figure 6:
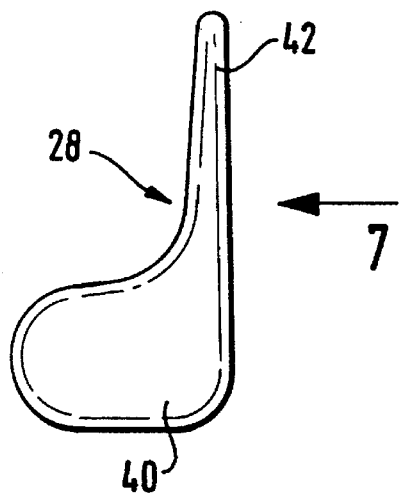
FIG. 6 is a plan view of one of the fastening elements holding the hinge cup shown in FIGS. 2 to 5 mounted in the predetermined fastened position on the rear surface of a door leaf.
Figure 7:
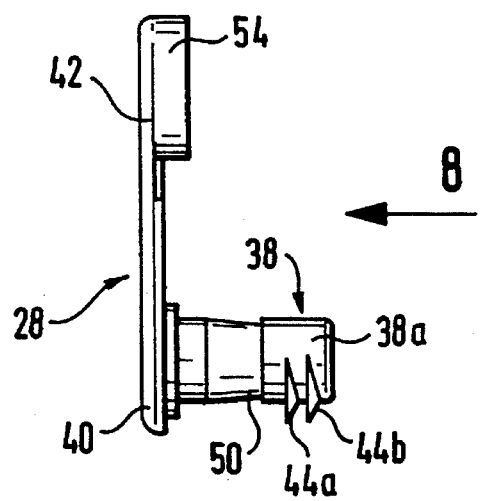
FIG. 7 is a side view of the fastening element, seen in the direction of the arrow 7 in FIG. 6.
Figure 8:
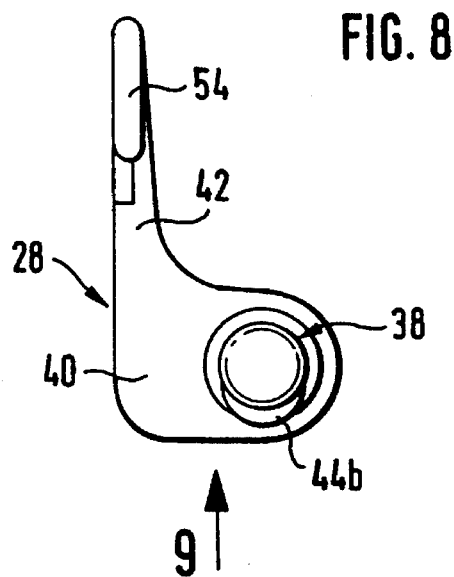
FIG. 8 is an underneath view of the fastening element, seen in the direction of the arrow 8 in FIG. 7.
Figure 9:
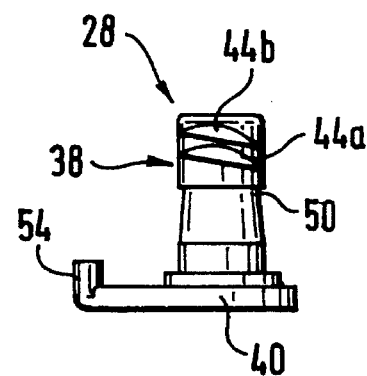
FIG. 9 is a view of the fastening element, seen in the direction of the arrow 9 in FIG. 8.

Schematically illustrated in FIG. 1 is a furniture hinge, which is designated as a whole with 20 and in which a carcass fastening member, which is constructed as an elongate support arm 22 and may be adjustably fastened to the side wall of a cupboard, is coupled by means of a joint mechanism, which is constituted by two hinge control levers, of which only one hinge control lever 24 is shown, to a door leaf fastening member, which is constructed in accordance with the invention and is constructed as a hinge cup 26 which may be mounted sunk in a recess in the rear surface of a door leaf—not shown. The actual hinge cup 26 itself, which is manufactured, for instance, of metal in an injection die casting process, can be shaped in the manner described below in connection with FIGS. 2 to 5 and is then releasably held in or on the door leaf by two fastening elements 28 described in detail in conjunction with FIGS. 6 to 9.

The hinge cup 26 shown in FIGS. 2 to 5 without the fastening elements 28 is composed of the actual cup member 30, which may be inserted sunk into the associated recess in a door leaf, and a fastening flange 32, which is arranged at the upper edge thereof and projects laterally on both sides and whose underside directed towards the door leaf engages on the inner surface of the door leaf, when the hinge cup 26 is installed.

Projecting with a lateral spacing from the actual cup member 30 from the underside of the fastening flange are fastening pegs 34, which are offset and engage in associated bores in the door leaf and which can be thought of as pegs originally of circular cross-section in which a continuous bore is eccentrically formed, i.e. a bore which also passes through the fastening flange, the diameter of which is so selected that a through opening 36 is produced in the vicinity of the fastening pegs 34 which has a slit-like opening to the exterior. The fastening pegs originally of closed circular cross-section thus have a crescent or moon-shaped cross-section, whereby the breadth of the slit produced is selected to be approximately the same as the diameter of the shaft 38 of the fastening elements 28, which are yet to be described below in conjunction with FIGS. 6 to 9. The shaft 38, which is basically of circular cross-section, of the fastening element 28 thus, in the installed state, completes the respective associated fastening pegs 36 into a fastening peg which is closed all around.

The shaft 38 of the respective fastening element 28 is pushed through the opening 36 from the upper surface of the fastening flange into the fastening peg 34 until a plate 40 provided at the upper end of the shaft 38 engages the upper surface of the fastening flange. Formed on the plates 40 is a respective lever arm 42, which serves as a handle, which enables rotation of the fastening element 28.

The length of the shaft 38 of the fastening element 28 is so selected that it projects out of the underside of the fastening peg 34 and provided in this projecting region 38a on the periphery of the peg are two anchoring ribs 44a,44b, which are sharpened in a manner of knife edges, spaced apart in the longitudinal direction of the peg and extend over a proportion of the periphery and which, depending on the rotary position, are rotated to below the wall of the remainder of the fastening peg or into a position pointing in the direction of the slit. The radial projection of the anchoring ribs 44a,44b is so selected that, when aligned with the fastening peg so that they are situated beneath the region of greatest wall thickness of the fastening peg, they do not project beyond the projection of the respective fastening peg whilst in a position rotated towards this wall region they project radially beyond the fastening peg projection. The position of the lever arm with respect to the arrangement of the anchoring ribs 44a,44b on the shaft section 38a is so selected that the anchoring ribs point in the direction of the open slit when the respective lever arm 42 is rotated over the fastening flange and is then arranged together with the plate 40 fitting over the fastening flange. Conversely, the anchoring ribs 44a,44b are rotated beneath the projection of the fastening peg 34 when the lever arm is rotated outwardly through 180°. In this latter position the hinge cup 26 can be installed, whereby the fastening pegs 34 may be inserted together with the inserted shaft 38 of the fastening element 28 into appropriately dimensioned fastening bores provided laterally of the recess in the rear surface of the door leaf. The anchoring ribs 44a,44b do not prevent this insertion because they are situated within the projection of the fastening pegs. If the lever arms 42, which are directed outwardly during the introduction, of the fastening elements 28, are rotated through 180° into their position situated above the fastening bores 33, the anchoring ribs are rotated outwardly and then cut into the wall of the associated fastening bore in the door leaf and anchor the shaft 38 and thus also the fastening peg 34 and thus also the hinge cup 26 in a form-locking manner within the fastening bores. Due to the gently obliquely inclined arrangement of the anchoring ribs 44a,44b, which may seen in particular in FIG. 9, whilst anchoring the hinge cup 26 during anchoring of the fastening elements 28 in the fastening bores, a certain tightening can be achieved which then forces the fastening flange 32 of the hinge cup 26 firmly against the inner surface of the door leaf via the plates 40.

In order to demount the hinge cup the lever arms 42 are then merely rotated outwardly through 180° again, whereby the anchoring ribs come out of engagement with the bore wall and are positioned beneath the projection of the fastening pegs 34. The hinge cup is then removable without difficulty from the door leaf or conversely a door leaf is retractable from the hinge cup of a hinge 20 mounted on a cupboard carcass.

By suitable shaping of the boundary of the plate 40 and of the lever arm 42 of the respective fastening element 28 the hinge cup 26 in accordance with the invention can be so constructed that it affords a homogeneously closed appearance in the installed position, i.e. that the manually actuable fastening elements 28 do not impair the optical appearance of the hinge cup.

It should further be mentioned that the opening 36 in the region of the fastening flange 32 is so broadened outwardly, i.e. pointing away from the central longitudinal plane of the hinge cup 26, that the shaft 38, which is provided with the anchoring ribs 44a,44b of the fastening element 28 may be passed through the opening.

In order to ensure that the installed fastening element 28 can not inadvertently be withdrawn again when the lever arms are rotated outwardly, i.e. into the installed position, low projections 48 (FIGS. 2 and 4) are provided which project from the wall, which rotatably supports the shaft 38 of the fastening element 28, of the opening 36 in the fastening peg 34 directly laterally adjacent the opening slit, which projections engage in an associated recess 50, which extends in the peripheral direction, in the shaft of the fastening element and restrain it from being withdrawn out of the opening. In order to make the installation of the fastening element in the hinge cup 26 possible despite these projections 48 and on the other hand to prevent undesired withdrawal, the projections have a triangular cross-section whose triangular side lying at the front in the direction of sliding in of the shaft of the fastening element into the opening has a flat, inclined, ramp-like shape with respect to the internal wall of the opening whilst the rear side of the triangle extends substantially at right-angles to the wall of the opening. The recess 50 in the shaft 38 of the fastening element 28 has an appropriately complementary cross-section.

Due to cooperating abutments provided on the fastening flange 32 and the fastening elements 28, the rotation of the fastening element can be limited to the necessary rotational angle of 180° for rotation from the mounting position into the locked position. In the construction of the hinge cup 26 which is illustrated only schematically in FIG. 1, the abutments on the hinge cup side are constituted by regions 52 of increased height, i.e. projecting from the surface of the actual fastening flange 32, which are so shaped that in the illustrated locked position the lever arms engage the outer boundary of these regions of increased height whilst in the mounted position rotated outwardly through 180° the edges, which are aligned in FIG. 1 with the outer edges of the fastening flange 32, of the plates 40 of the fastening elements engage the projecting regions 52.

In the construction of the hinge cup 26 described in connection with FIGS. 2 to 9, downwardly projecting abutment ribs 54 are provided on the underside of the lever arms 42 which, in the locked position, engage in a corresponding recess 56 in the transversely extending boundary edge of the fastening flange 32. In the mounting position, on the other hand, the edges, which are situated outwardly in the locked position, of the plates 40 of the fastening elements 28 cooperate with the boundaries of the projecting regions 52 as abutments.

Figure 10:
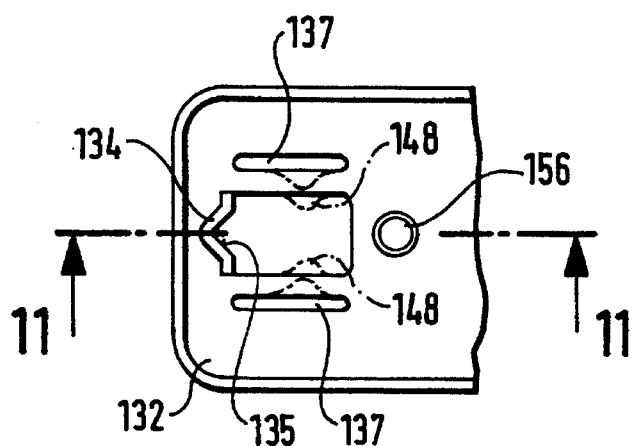
FIG. 10 is a plan view of the outer portion of a fastening flange of a second exemplary embodiment of a hinge cup constructed in accordance with the invention.
Figure 11:
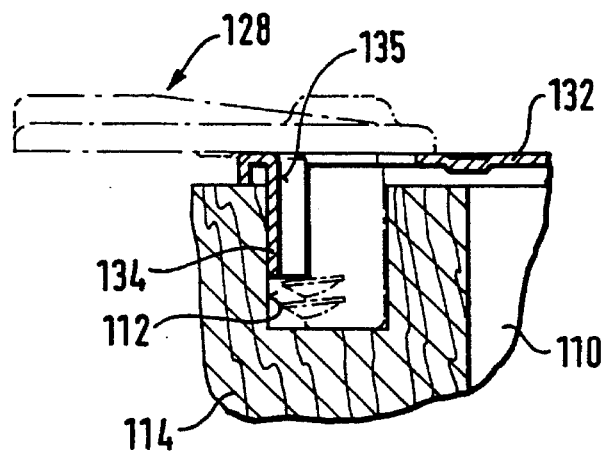
FIG. 11 is a sectional view, seen in the direction of the arrows 11—11 in FIG. 10, whereby the fastening peg attached to the fastening flange is situated in an associated fastening bore in the rear surface of the door leaf and the associated fastening element is illustrated in chain-dotted lines in the position in which the insertion of the fastening peg into the fastening bore is possible.
Figure 12:
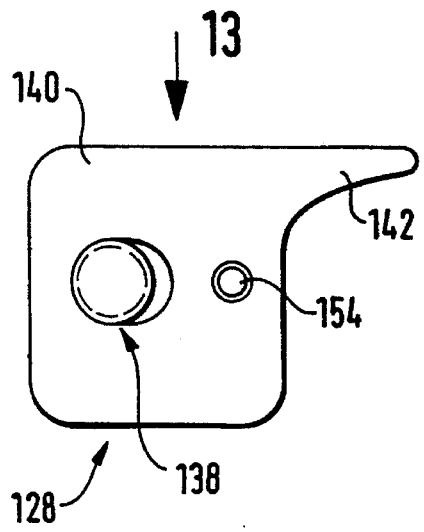
FIG. 12 is an underneath view of the fastening element used in conjunction with the second exemplary embodiment.
Figure 13:
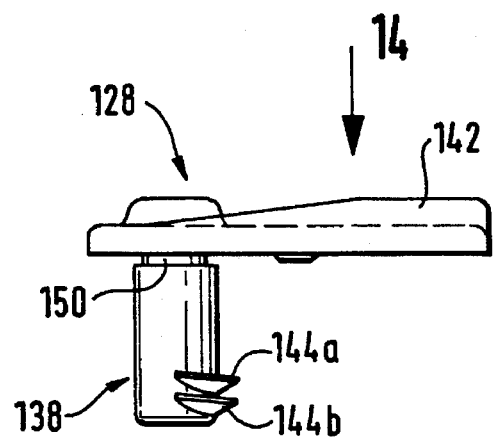
FIG. 13 is a view of the fastening element, seen in the direction of the arrow 13 in FIG. 12.
Figure 14:
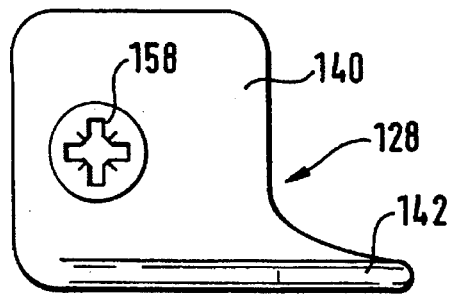
FIG. 14 is a plan view of the fastening element, seen in the direction of the arrow 14 in FIG. 13.

A modified exemplary embodiment of a hinge cup manufactured from metal plate in a stamping-pressing method is shown in FIGS. 10 and 11, whereby of the entire hinge cup only an outer section, i.e. a section situated adjacent the actual cup member, of its fastening flange 132 is shown. Since the hinge cup corresponds to normal hinge cups of metal plate—apart from the construction of the arrangement of its fastening peg 134 and of the fastening element 128 which will be described in more detail—, the hinge cup will be described only in relation to the construction of these portions which produce the desired simple and rapid mounting and demounting of the hinge cup in the bores 112, which are arranged adjacent the recess 110 for receiving the actual cup member, in a door leaf 114 (FIG. 11). The fastening peg 134 associated with the illustrated fastening flange section is constituted by a tongue which is stamped out of the material of the fastening flange 132 along three edges and which is bent over at right-angles downwardly, i.e. in the direction of the actual cup member. Since the wall thickness of the plate material does not permit the manufacture of a fastening peg with locally increased wall thickness corresponding to the fastening peg 34 of the hinge cup 26, the space necessary for the anchoring ribs 114a,114b of the fastening element in its mounting position is produced by providing the bent over tongue constituting the fastening peg 134 with the groove-like profiling 135, which may be seen in FIGS. 10 and 11 and extends in the longitudinal direction of the fastening peg and whose depth is so dimensioned that the anchoring ribs 144a,144b, rotated into alignment with the profiling 135, on the shaft 138 of the fastening element 128 does not or do not project radially beyong the profiling. The fastening peg 134 profiled in this manner then only partially engages, i.e. not over its entire surface, the wall of the bore 112 accommodating it but this engagement is sufficient in conjunction with the engagement of the shaft 138 of the fastening element 128 in the bore 112 to precisely and exactly align and retain the hinge cup.

In order to retain the installed fastening element 128 in the opening 136 formed by stamping out the fastening peg 134, slits 137 are stamped in the fastening flange 132 at a parallel spacing from the lateral borders of the opening 136 and prestamped projections 148 are provided in the web material of the fastening flange remaining between the opening 136 and the respective slit after the introduction of the shaft 138 of the fastening element into the opening 136, which projections engage, when the fastening element 128 is installed, in a peripheral groove 150 in the shaft 138 of the fastening element and thus secure the fastening element against retraction out of the opening 136.

In other respects the fastening element 128 substantially corresponds to the fastening element described in conjunction with FIGS. 6 to 9, i.e. a plate 140, on which the lever arm constituting the handle is formed, is again attached to the upper end of the shaft 138. The outer border of the plate 140 with the attached lever arm 142 is again so selected that the fastening element 128 is aligned flush with the fastening flange 132, in the locked position.

The fixing of the fastening element 128 in the anchored position is effected by cooperating abutments on the fastening element and on the hinge cup which, in the special case, are constituted by a low projection 154 projecting from the underside of the plate 140 and an associated recess 156 impressed in the fastening flange. The fastening element 128 is also—like the fastening element 28 shown in FIGS. 6 to 9—constructed as an integral injection die cast metal component.

In order also selectively to be able to rotate the fastening element 128 with a tool, a tool application recess 158 in the form of a cruciform slit is additionally formed in this case on the upper surface of the plate 140 in alignment with the longitudinal central axis of the shaft 138 so that mounting and demounting of the hinge cup is thus also possible by means of a cross head screw driver.

Figure 15:
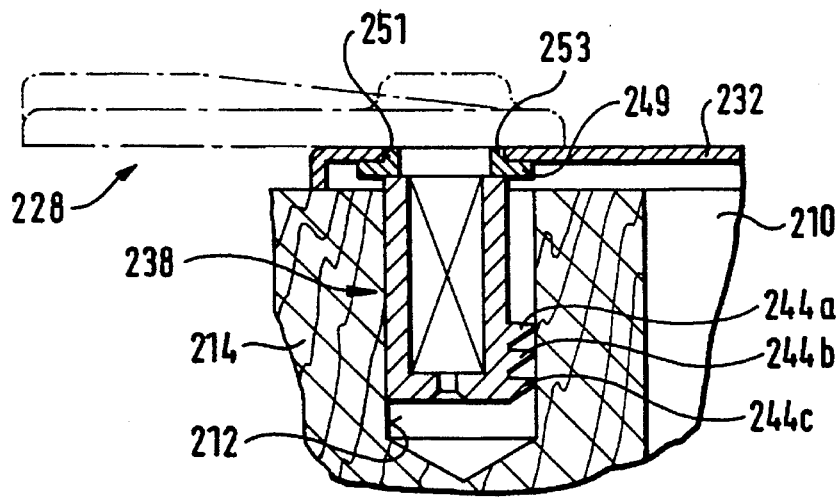
FIG. 15 is a sectional view corresponding to FIG. 11 of a further exemplary embodiment of the invention.
Figure 16:
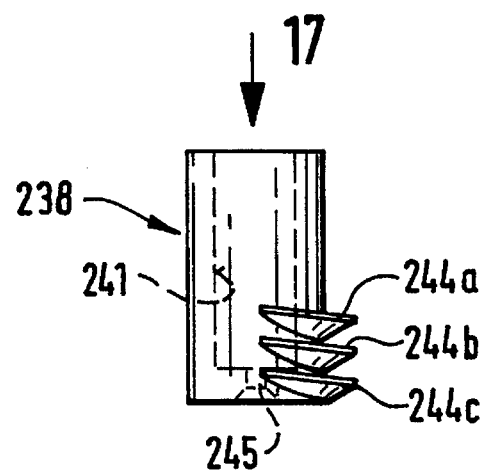
FIG. 16 is a side view of the separately manufactured shaft of a fastening element of the exemplary embodiment shown in FIG. 15, which shaft simultaneously constitutes one of the fastening pegs of the hinge.
Figure 17:
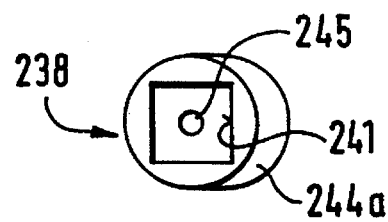
FIG. 17 is a view seen in the direction of the arrow 17 in FIG. 16.
Figure 18:
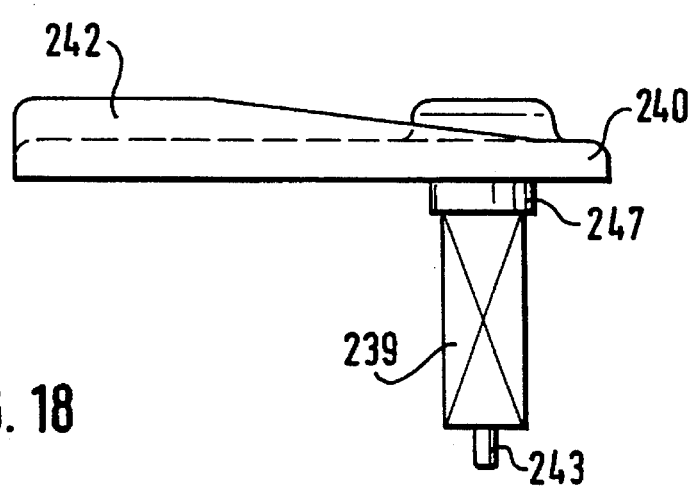
FIG. 18 is a side view of a second, separately manufactured portion of the fastening element.

A further exemplary embodiment of a hinge cup in accordance with the invention is shown in FIGS. 15 to 18, whereby of the entire hinge cup in this case also only an outer section, that is to say situated adjacent the actual cup portion, of the fastening flange 232 is shown. In this exemplary embodiment no separate fastening peg or residual fastening peg is provided on the actual hinge cup or its fastening flange 232 but instead the function of this fastening peg is performed simultaneously by the shaft 238 of the fastening element 228. The actual fastening element is constituted in this case by two members, namely the shaft 238 shown in FIGS. 16 and 17 and the second member shown in FIG. 18, which is composed of the handle provided with the lever arm 242 and an elongate carrier peg 239 projecting from its underside and of polygonal, e.g. square, cross-section, which may be inserted into an opening 241 of complementary polygonal cross-section in the shaft 238. Provided at the lower end of the carrier peg 239 is a peg projection 243 of reduced diameter which may be passed through an associated opening 245 of reduced diameter in the lower end of the shaft 238. By riveting or deforming the projecting portion of the peg projection 243 a shaft is then unreleasably and rotationally fixedly secured to the carrier peg 239. Provided in the transition region between the handle and the carrier peg 239 of polygonal cross-section is a circular section bearing section 247 whose diameter is somewhat smaller than the diameter of the shaft 238 so that the upper end surface of the shaft 238 forms an annular collar on which the disc 249, which is of enlarged diameter and is shown in FIG. 15, may be mounted, which secures the shaft 238 when rotationally locked against tilting as a consequence of the locking forces produced at right-angles to its axis of rotation by supporting it at the underside of the fastening flange 232. An annular projection 253, which projects upwardly from the actual disc 249 and engages in the opening 251 in the fastening flange 232, forms so to speak the bearing bush in which the bearing section 247 is rotatably mounted.

The position of the fastening peg constituted by the shaft 238 during installation of the hinge cup is shown in FIG. 15. As soon as the hinge cup is pushed into the predetermined installed position, the handle, which is provided with the lever arm 242 and is illustrated in chain-dotted lines in FIG. 15, is rotated through 180° whereby the locking ribs 244a, 244b, 244c, which were previously situated within the fastening bore in the door leaf 214, on the side opposite to the recess 210 for the actual cup portion of the hinge cup cut into the wall of the fastening bore and the hinge cup is thus fixed in a form locking manner in the fastening bores by the two fastening elements 228 provided.

Figure 19:
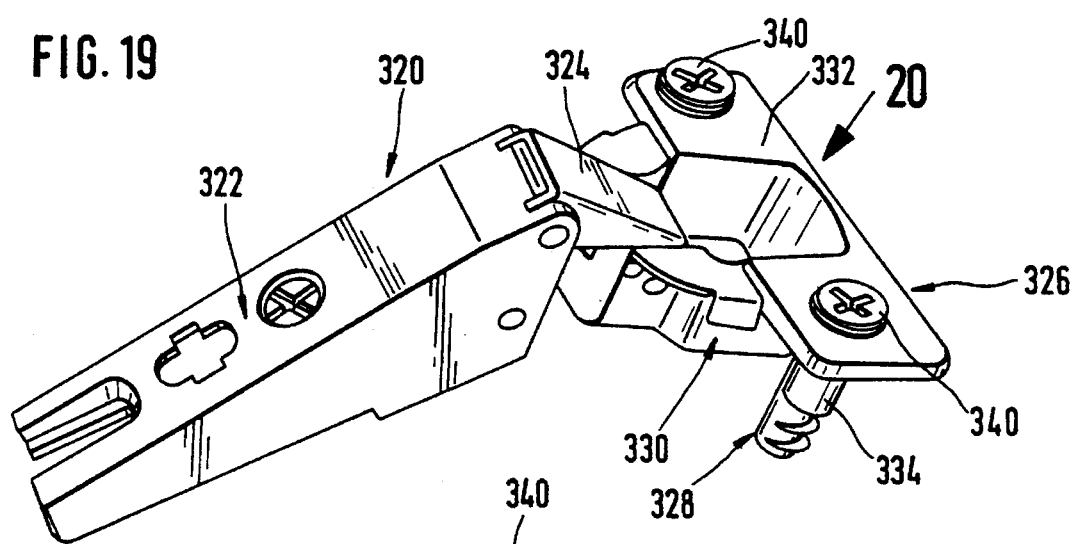
FIG. 19 is a perspective view of a furniture hinge whose door fastening member is constructed as a hinge cup which is constructed in the manner in accordance with the invention and which may be mounted sunk in a recess in the rear surface of a door leaf.

Schematically illustrated in FIG. 19 is a furniture hinge which is designated as a whole with 320 and in which a carcass fastening member, which is constructed as an elongate support arm 322 and which may be adjustably fastened to the side wall of a cupboard, is coupled by means of a joint mechanism constituted by two hinge levers, of which only hinge lever 324 is shown, to a door leaf fastening member in accordance with a fourth exemplary embodiment, which is constructed as a hinge cup 326, which is constructed in the manner in accordance with the invention and may be mounted in the rear surface of a door leaf—not shown. The actual hinge cup 326 itself—for instance manufactured of metal plate in a stamping-pressing process—can be constructed in the manner described below in more detail and is then releasably fastened on or in the door leaf by two fastening pegs 334 (FIGS. 21 to 24) and fastening elements 328 rotatably secured in these fastening pegs 334. The hinge cup 326 is composed of the actual cup member 330, which may be inserted sunk in the associated recess in the door leaf, and the fastening flange 332, which is arranged at its upper edge and projects laterally on both sides and whose underside directed towards the door leaf engages the inner surface of the door leaf when the hinge cup 326 is installed.

Projecting from the underside of the fastening flange 332 is the larger portion of the fastening peg 334, which in this special case is manufactured separately of plastic material in an injection moulding process and which can be thought of in the region projecting from the underside as a peg originally of circular cross-section and eccentrically formed in which is a bore which passes completely through the fastening peg, the diameter of which is so selected that produced in the region of the fastening pegs 334 engaging in the bores in the door leaf there is a through opening 336 which opens out into the exterior in the manner of a slit. The fastening pegs, which are originally of circular closed cross-section, thus have a crescent or new moon cross-section, the breadth of the slit which is produced being selected to be approximately equal to the diameter of the shaft 338 of the fastening element 328 which will be described in more detail below in conjunction with FIGS. 25 to 28. The shaft 338, which is basically of circular cross-section, of the fastening element 328 thus, in the installed state, completes the respective associated fastening peg 334 in the region engaging in the bores in the door leaf into a fastening peg which is closed all round.

The—as mentioned—separately manufactured fastening peg 334 has at its upper, i.e. fastening flange, end an engagement flange 334a and is traversed from above by a stamped out portion 332a in the fastening flange 332. Due to the shape of the stamped out portion 332a, which may be seen in FIG. 20 in the lower region of the fastening flange 332 and differs from the circular, and of the complementarily shaped boundary of the fastening peg 334 in its adjacent region 334b directly beneath the engagement flange 334a (FIG. 23) the fastening peg 334 can only be installed in the fastening flange 332 in a defined rotational position, that is to say in the specific case so that the region of greatest wall thickness of the fastening peg 334 is arranged pointing outwardly, i.e. away from the actual cup member 330.

The fastening peg 334 is secured against withdrawal out of the predetermined installed position by the fact that projecting from the underside of the engagement flange 334a at a parallel spacing corresponding to the thickness of the material of the fastening flange 332 there is a rib-shaped formation 334c which forms a radially projecting locking surface 334d on the engagement flange side and on the opposite side has an oblique ramp or wedge shaped boundary 334e. On pushing the actual fastening peg 334 through the stamped out portion 332a it may be pressed into the stamped out portion whilst elastically deforming the formation 334c until the underside of the engagement flange 334a engages the upper surface of the fastening flange. The locking surface 334d then engages beneath the regions adjacent the stamped out portion 332a of the underside of the fastening flange and secures the fastening peg against withdrawal out of the stamped out portion.

The fastening element 328, which is illustrated separately in FIGS. 25 to 28 and—as mentioned—is rotatably mounted in the through opening 336 in the respective associated fastening peg 334, has an elongate shaft 338, which is of circular cross-section over the major portion of its length and provided on whose upper, i.e. fastening flange, end there is an end plate 340, which is of circular disc shape in plan view and whose diameter corresponds to the diameter of the engagement flange 334a so that it fittingly covers the engagement flange 334a in the predetermined installed position. Provided in the upper surface of the end plate 340 pointing away from the fastening flange 332 there is a recess constructed as a cross slot 342 for the application of a cross head screwdriver (not shown) with which the fastening element can be rotated in the fastening peg 334.

The length of the shaft 338 of the fastening element 328 is so selected that it projects out of the underside of the fastening peg 334 and provided in this projecting region 338a on the periphery of the peg are anchoring ribs 344a, 344b, which are sharpened in the manner of knife edges, spaced apart in the longitudinal direction of the peg and extend over a portion of the periphery and which, depending on the rotational position, are rotated beneath the wall of the remainder of the fastening peg or into a position pointing in the direction of the slit. The radial projecting length of the anchoring ribs 344a,344b is so selected that, when aligned with the fastening pegs so that they are situated beneath the region of greatest wall thickness of the fastening peg, they do not project beyond the projection of the respective fastening peg whilst in a position rotated towards this fastening region they project radially beyond the fastening peg projection.

Projecting upwardly from the upper surface of the engagement flange 334a in its edge region there is a projection 334f, associated with which in the underside directed towards it of the end plate 340 there is an arcuate recess 340a. The arcuate size of the recess 340a is so dimensioned that the rotation of the actuating element is limited to a rotational angle of 180°, whereby the projection 334f is held locked in the two end positions by radial recesses 340b,340c respectively provided there.

Figure 20:
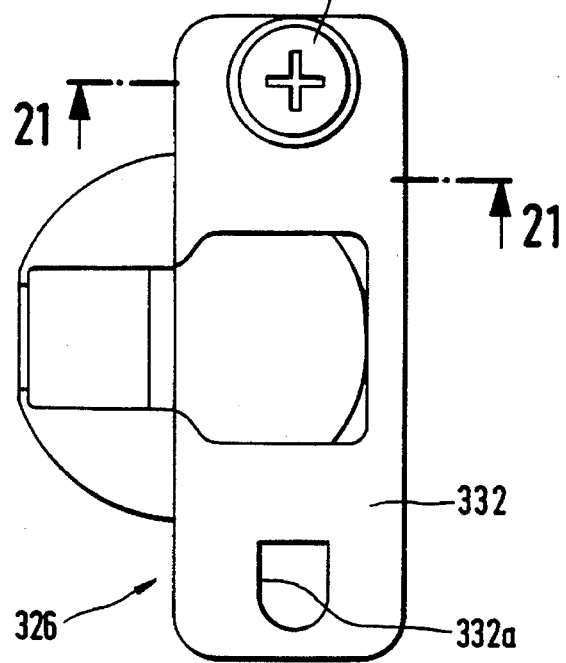
FIG. 20 is a plan view of a fourth exemplary embodiment of a hinge cup in accordance with the invention seen in the direction of the arrow 20 in FIG. 19.
Figure 21:
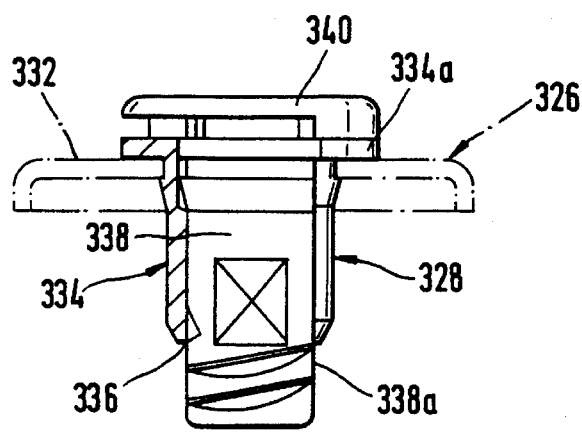
FIG. 21 is a sectional view through the fastening flange of the hinge cup along the arrows 21—21 in FIG. 20, the fastening element rotatably mounted in the fastening peg remaining unsectioned.

Below the end plate 340 the shaft 338 of the fastening element is of somewhat enlarged diameter in the region 338c, a groove 338d being provided in this shaft portion 338c of the enlarged diameter in which, in the predetermined installed position, the straight boundary edge of the stamped out portion 332a at the top in FIG. 20 engages and thus secures the fastening element against axial withdrawal out of the through opening 336. The transition region between the actual shaft 338 and the upper shaft portion 338c up to the groove is constructed as an oblique conical surface 338e so that when plug installing the fastening peg provided with the preinstalled fastening element 328 into the stamped out portion 332a the straight securing edge of the stamped out portion slides up on the conical surface and can then snap into the groove 338d when it reaches the predetermined installed position.

In order to fix the hinge cup 326 in the bores accommodating the fastening pegs 334 in the door leaf in addition to the anchoring by the anchoring ribs 344a,344b, which cut into the bore wall, a wall region 336a, which is flat surfaced on its side directed towards the shaft 338 of the fastening element 328, projects in the end region directed away from the fastening flange of the through opening 336 into its region of greatest wall thickness with respect to the wall of the through opening 336 which is otherwise of circular arcuate shape in cross-section, associated with which wall region there is a corresponding recess 338f in the opposing region of the shaft 338 of the fastening element 328 rotated into the insertion position. In the insertion position, i.e. when the anchoring ribs 344a,344b, sharpened in the manner of knife edges, are rotated beneath the region of greatest wall thickness of the fastening peg 334, the projecting wall region 336a engages fittingly in the recess 338f and no expanding action is exerted on the fastening peg 334 by the shaft 338. If the fastening element, however, is rotated for the purpose of anchoring it after insertion of the fastening peg into an associated fastening bore in the door leaf, the projecting wall region 336a and the recess 338f come out of registry and the projecting wall region is urged outwardly by the cylindrical shaft wall, whereby the fastening peg is enlarged by way of an expansion and an additional force-locking fastening of the fastening peg in the fastening bore is produced.

The fastening element 328 is preferably an integral pressure die cast metallic component, for instance of a suitable zinc alloy (Zamak). The fastening peg 334, on the other hand, is preferably manufactured from a thermoplastic plastic material in an injection moulding process although it can basically also be constructed as a metallic pressure die casting.

Illustrated in FIGS. 29 to 36 are modifications effected on a further exemplary embodiment of the invention with respect to the exemplary embodiment described above in the region of the stamped out portions 332a in the fastening flange 332 of the actual hinge cup 326 (FIGS. 29 and 30), of the fastening peg 334 (FIGS. 31 to 33) and of the fastening element 328 (FIGS. 34 to 36). Only the modifications effected will be described below whilst it will be sufficient with respect to the general construction to refer to the preceding description of the fourth exemplary embodiment, particularly as the same reference numerals are associated in the drawings with the same components of both exemplary embodiments.

The lower portion of the fastening flange 332 of the modified hinge cup 326 is illustrated in FIGS. 29 and 30, whereby it may be seen that provided on the edge on the cup member side of the stamped out portion 332a there is a tongue 332b, which is stamped free from the material of the fastening flange in the region of the stamped out portion and is bent upwardly and is arcuate in plan view and which on the one hand has the function of a rotary fastening for an adapted fastening peg 334 shown in FIGS. 31 to 33 and on the other hand has an abutment limiting the rotation of the fastening element 328 shown in FIGS. 34 to 36 to an angle of 180°.

The modification of the fastening peg 334 relates to the fact that provided in the engagement flange 334a, which is of continuous circular shape in the fourth exemplary embodiment, in alignment with the region of the through opening 336 which passes out into the exterior in the manner of a slit, there is a radially continuous interruption 335, whose breadth is so dimensioned that the tongue 332b bent up from the fastening flange 332 precisely engages in it and completes the fastening flange 334a at its periphery to form a complete circular shape again. It is clear that due to the tongue 332b engaging in the interruption 335 an additional rotational security of the fastening peg is obtained in the predetermined installation position in the stamped out portion 332a. If the tongue 332b is higher than the thickness of the engagement flange 334a, it can also serve directly as an abutment for the correspondingly shaped end plate 340 (FIG. 36) of the fastening element 328.

Also illustrated in FIGS. 31 to 33 and 34 to 36 are further embodiments which ensure rotational security of the fastening element 328 in the fastening peg 334 in the initial position which is necessary for the installation of the hinge cup. Thus it may be seen in FIGS. 31 to 33 that projecting from the projecting wall region 336a in the through opening 336 of the fastening peg 334 there is also a narrow elongate formation 336b and that provided in the base region of the recess 338f in the shaft 338 of the fastening element 328 there is a recess 338h which fittingly receives the formation 336b. As a result of the formation 336b engaging in the recess 338h the fastening element 328 is thus held rotationally fastened in the desired initial position. If, after insertion of the hinge cup into the recess or of the fastening pegs into the associated fastening bores, the hinge cup is fixed by rotation of the fastening elements, the formation 336b projecting from the wall region 336a is sheared off and carried in the recess 338h in the direction of rotation.

We claim:

1. Door fastening member of a furniture hinge constructed as a hinge cup for installation sunk in a recess in a rear surface of a door leaf, which door fastening member comprises a cup member having a fastening flange extending from an upper edge of the cup member which fastening flange engages an inner surface of the door leaf when in the properly installed position, the fastening flange having projecting from its underside, at a lateral spacing from the cup member, offset fastening pegs which engage in associated bores in the door leaf when in the properly installed position and which fastening pegs may each be fixed in the associated bore by means of a fastening element which is rotatable relative to the fastening flange, the fastening pegs each being provided with a through opening which opens out to an upper surface of the fastening flange and in which a respective shaft of the fastening element is rotatably mounted, the through openings in the fastening pegs being eccentrically arranged so that the fastening pegs have a greater wall thickness over a region in a peripheral direction than in a diametrically opposed region, a lower region of the shafts of the fastening elements projecting out of open undersides of the through openings remote from the fastening flange, and each fastening element having, in the projecting region, at least one anchoring rib which is sharpened in the manner of a knife edge and extends substantially in the peripheral direction and which, in a rotary position of the fastening element (28;128) aligned with the region of greatest wall thickness, the at least one anchoring rib does not project radially beyond the radial projection of the respective fastening peg while in a position of the fastening element rotated to the diametrically opposed wall region, the at least one anchoring rib projects radially beyond the fastening peg radial projection, and attached to an upper region of the fastening shaft adjacent the fastening flange there is located a handle comprising a lever arm with respect to the rotary axis of the fastening element.

2. Door fastening member as claimed in claim 1, wherein the eccentricity of the through opening in the fastening peg is so selected that it forms an opening in the shape of a slit in the region of the fastening peg opposite to the region of greatest wall thickness and wherein the shaft of the fastening element completes the fastening peg in the slit-shaped region to form a fastening peg with an effectively closed peripheral wall.

3. Door fastening member as claimed in claim 2, wherein the breadth of the slit-shaped region is exactly equal to the diameter of the shaft of the fastening element.

4. Door fastening member as claimed in claim 2, wherein the handle provided at the upper region of the shaft of the fastening element has the form of a flat handle fittingly covering a portion of the fastening flange at the upper surface therefore, formed integrally on which handle is a lever arm which enables the rotary actuation.

5. Door fastening member as claimed in claim 3, wherein the through opening in the fastening flange is so enlarged in the region diametrically opposite to the wall region of greatest wall thickness that the shaft of the fastening element may be passed through the through opening in the fastening flange when the shaft of the fastening element is rotated into a position in which the at least one anchoring rib is aligned with this enlarged region.

6. Door fastening member as claimed in claim 4, wherein provided on the fastening flange and the handles of the fastening elements are cooperating abutments which limit the rotation of the fastening element in the fastening peg between an introduction position, in which the at least one anchoring rib does not project radially beyond the projection of the fastening peg and a locked position which projects the maximum amount by comparison to a rotational angle of about 180°.

7. Door fastening member as claimed in claim 1 in which the hinge cup is formed from metal in an injection die casting process, and wherein the fastening pegs are integrally molded onto the underside of the fastening flange.

8. Door fastening member as claimed in claim 7, wherein projecting radially inward from an inner wall, which rotatably supports the shaft (38) of the fastening element of the through opening in the fastening peg there is at least one projection for engaging in an associated conforming recess in the shaft of the fastening element to thereby secure the shaft against being withdrawn from the through opening.

9. Door fastening member as claimed in claim 8, wherein the at least one projection has a triangular cross-section whose front triangular side in the direction of insertion of the shaft of the fastening element into the through opening has a flat, inclined, ramp-like shape with respect to the inner wall of the through opening whilst the rear triangular side in the direction of insertion extends substantially at right-angles to the inner wall of the through opening and wherein the recess in the shaft of the fastening element has, on its side directed away from the handle, a boundary wall extending in the peripheral direction substantially at right-angles to the peripheral surface of the shaft.

10. Door fastening member as claimed in claim 1 in which the hinge cup is formed from metal plate in a stamping-pressing process, wherein the fastening pegs are constituted by tongues which are stamped out of the material of the fastening flange and bent over through 90° in the direction of the underside of the fastening flange directed towards the door leaf when in the properly installed position.

11. Door fastening member as claimed in claim 10, wherein impressed into each of the tongues is at least one groove-like profiling, which extends in the longitudinal direction of the fastening peg and whose depth is so dimensioned that the at least one anchoring rib of the fastening element, rotated in alignment with the profiling, of the fastening element supported with its shaft engaging the tongue does or do not project radially beyond the profiling.

12. Door fastening member as claimed in claim 10, wherein cut into the upper region of the shaft of the fastening element adjacent and below the handle there is a circumferential groove for engagingly receiving projections which project from the edges of the through opening.

13. Door fastening member as claimed in claim 11, wherein slits are stamped in the fastening flange at a small spacing from and parallel to the longitudinal edges of the through opening adjacent the fastening flange, the projections for engaging in the circumferencial groove in the shaft of the fastening element being constituted by deformed regions of narrow webs defined one each between each of the longitudinal edges of the through opening and the slits.

14. Door fastening member as claimed in claim 1, wherein the fastening element is constructed as an integral pressure die cast metal member.

15. Door fastening member as claimed in claim 1, wherein the at least one anchoring rib provided on each of the elongate shaft extend in the peripheral direction at a slightly oblique incline with respect to a plane extending at right-angles to the central longitudinal axis of the elongate shaft, whereby the direction of inclination is so selected that each of the elongate shafts experiences a tightening in the direction into the associated bore in the door leaf upon rotation of the fastening element from a position of the peripheral edge the at least one anchoring rib lying within a cavity of the bore into a position wherein the peripheral edge of the at least one anchoring rib cuts radially into the wall of the bore.

16. Door fastening member as claimed in claim 1, wherein a tool application recess is provided in fastening element.

17. Door fastening member as claimed in claim 16, wherein the tool application recess is in alignment with the central longitudinal axis of the shaft of the fastening element.

18. Door fastening member as claimed in claim 1, wherein the fastening pegs are separate components and are held rotationally fixed in a respective associated stamped out portion in the fastening flange.

19. Door fastening member as claimed in claim 18, wherein the eccentricity of the through opening in the fastening peg is so selected that it opens out to form a slit-like cut-away region into the exterior in the region of the fastening peg opposed to the region of greatest wall thickness and the shaft of the fastening element completes the fastening peg in the slit-like cut away region into a fastening peg with an effectively closed peripheral wall.

20. Door fastening member as claimed in claim 19, wherein provided in the region of greatest wall thickness of the fastening peg, adjacent the through opening, in the end region of the fastening peg directed away from the fastening flange there is a wall region projecting with respect to the wall, which wall is otherwise of circular arcuate shape in cross-section, and in the region of the elongate shaft which faces the projecting wall region when the fastening element is rotated into an insertion position in the fastening peg within the associated bore there is a corresponding recess for engaging the projecting wall region.

21. Door fastening member as claimed in claim 20, wherein the projecting wall region is flat surfaced and the recess has a corresponding flat surfaced base region.

22. Door fastening member as claimed in claim 20, wherein projecting from the projecting wall region of the fastening peg there is a formation and provided in the base region of the recess in the shaft of the fastening element there is a recess which fittingly receives the formation.

23. Door fastening member as claimed in claim 18, wherein the fastening pegs are each provided at an upper end adjacent the fastening flange with an engagement flange projecting beyond the boundary of the respective associated stamped out portion.

24. Door fastening member as claimed in claim 23, wherein the engagement flange has a continuous interruption in alignment with the cut-away region of the through opening in the fastening peg, and wherein a tongue, which is cut away at the edge of the stamped out portion in the fastening flange, fittingly engages in the interruption.

25. Door fastening member as claimed in claim 23, wherein each of the stamped out portions in the fastening flange has a shape deviating from a completely circular shape and the fastening pegs have a shape in the adjacent region directly below the engagement flange which complementarily corresponds to the shape of the stamped out portion.

26. Door fastening member as claimed in claim 25, wherein the shape of the stamped out portion and of the adjacent region directly below the engagement flange are so constructed that installation of the fastening peg in the stamped out portion is only possible in a position in which the region of greatest wall thickness of the fastening peg has a predetermined alignment with respect to the cup member.

27. Door fastening member as claimed in claim 26, wherein the alignment of each of the stamped out portions in the fastening flange is such that the region of greatest wall thickness of the fastening pegs is situated in each case on the side directed away from the cup member.

28. Door fastening member as claimed in claim 20, wherein the alignment of each of the stamped out portions in the fastening flange is such that the region of greatest wall thickness of the fastening pegs is situated in each case on the side directed towards the cup member.

29. Door fastening member as claimed in claim 23 in which the fastening flange has a flat recess on its underside directed when installed towards the inner surface of an associated door leaf, at least in the region of the fastening pegs, wherein provided on each of the fastening pegs there is at least one formation constituting a radially projecting locking surface on a surface of the fastening peg directed towards the engagement flange and the spacing between the locking surface and the underside of the engagement flange is approximately equal to the thickness of the fastening flange in the region of the stamped out portion.

30. Door fastening member as claimed in claim 29, wherein the formation extends over at least a portion of the periphery of the fastening peg.

31. Door fastening member as claimed in claim 29, wherein the formation has a limiting edge which tapers in the manner of a wedge in the direction towards the free end of the fastening peg and which is in a sectional plane situated transversely through the longitudinal central axis of the fastening peg.

32. Door fastening member as claimed in claim 29, wherein provided in the region of the shaft of the fastening element opposite to the edges of the stamped out portion in the predetermined installed position of the fastening peg in the stamped out portion in the fastening flange there is a peripheral groove which extends over at least a portion of the periphery of the shaft and whose breadth is equal to the thickness of the fastening flange in the region adjacent to the stamped out portion and the edge bordering the stamped out portion engages in the peripheral groove in the region opposite to the region of greatest wall thickness of the fastening peg.

33. Door fastening member as claimed in claim 32, wherein the peripheral groove is provided in an upper shaft portion of slightly enlarged diameter with respect to the diameter of the elongate shaft and a transition region between regions of different diameter of the elongate shaft is constructed as an oblique conical surface extending in the peripheral direction.

34. Door fastening member as claimed in claim 23, wherein the engagement flange is of circular shape in plan view and attached to the upper region of the shaft adjacent the fastening element there is a circular shaped end plate covering the engagement flange, and provided in a surface of one of the engagement flange and the end plate there is a projection directed towards the other of the adjacent flange and the end plate which engages in an associated arcuate recess in the other of end plate or the engagement flange, and the projection and the recess are so arranged and dimensioned that the rotation of the fastening element is limited to a rotational angle of 180°.

35. Door fastening member as claimed in claim 34, wherein an application means is provided which enables the rotation of the shaft of the fastening element, the application means being constituted by one of a recess formed in the side of the end plate directed away from the shaft and a projection projecting from said side for the introduction or application of a rotary tool.

36. Door fastening member as claimed in claim 18, wherein the fastening peg is an injection molded plastic component.

37. Door fastening member as claims in claim 18, wherein the fastening peg is a pressure die cast metallic component.

38. Door fastening member as claimed in claim 18, wherein the rotatable actuating element is a pressure die cast metallic component.

39. Door fastening member of a furniture hinge constructed as a hinge cup for installation sunk in a recess in a rear surface of a door leaf, which door fastening member comprises a cup member having a fastening flange extending from an upper edge of the cup member which fastening flange engages an inner surface of the door leaf when in the properly installed position, the fastening flange having projecting from its underside, at a lateral spacing from the cup member, offset fastening pegs which engage in associated bores in the door leaf when in the properly installed position and which fastening pegs may each be fixed in the associated bore by means of a fastening element which is rotatable relative to the fastening flange, wherein the fastening pegs are each constituted by an elongate shaft which is rotatably mounted in a through opening in the fastening flange, the fastening pegs forming part of the fastening element the diameter of each of the fastening pegs being smaller than the diameter of the associated bore in the door leaf, wherein projecting from one side in an end region of the elongated shaft which resides in an installed position at the interior of the associated bore, there is at least one respective anchoring rib, which extends substantially in a radial direction and is sharpened in the manner of a knife blade, whereby the diameter of each of the fastening pegs in the end region thereof measured to include the peripheral edge of the at least one anchoring rib is approximately equal to the diameter of the associated bore, wherein the distance from the central longitudinal axis of each of the shafts from the central longitudinal plane of the hinge cup differs in each case from the distance of the central longitudinal axis of the associated bore in the door leaf to the central longitudinal plane of the hinge cup when the hinge cup is installed with its cup member in the associated recess in the door leaf by the distance of the projection of a longest one of the at least one the anchoring rib beyond the shaft, and wherein provided at an upper region of each of the shafts adjacent the fastening flange there is a respective handle which constitutes a lever arm with respect to the rotary axis of the shaft and is arranged on the upper surface of the fastening flange.

40. Door fastening member as claimed in claim 39, wherein the shaft and the handle are separate components and the handle is rotationally fixed to the upper region of the shaft on the fastening flange side of the shaft.

41. Door fastening member as claimed in claim 16, wherein the shaft is supported with a disc-shaped annular flange of enlarged diameter against the underside of the fastening flange.

42. Door fastening member as claimed in claim 41, wherein the annular flange is constituted by a disc which is a separate component and is arranged adjacent the upper region of the shaft on a collar provided on the shaft.

* * * * *